June 3, 1969 R. B. TAYLOR 3,447,367
LOAD CELL WITH REMOVABLE, LOW HYSTERESIS LOAD SENSORS
Filed April 19, 1967 Sheet 1 of 2

INVENTOR.
ROBERT B. TAYLOR
BY

United States Patent Office 3,447,367
Patented June 3, 1969

3,447,367
LOAD CELL WITH REMOVABLE, LOW HYSTERESIS LOAD SENSORS
Robert B. Taylor, Roanoke, Va., assignor to General Electric Company, a corporation of New York
Filed Apr. 19, 1967, Ser. No. 632,052
Int. Cl. G01l 5/12
U.S. Cl. 73—141                 7 Claims

ABSTRACT OF THE DISCLOSURE

For measuring normal compression forces, a load cell including a block having a bore with at least one removable sensor plug secured therein. A strain gage is mounted on the plug in a plane parallel to the direction of the force applied to the block. The peripheral edges of the plug and the bore are tapered to minimize hysteresis effects caused by transverse distortion of the block and to facilitate removal of the plug. Where multiple plugs are used, they are distributed throughout the block to permit sampling of the load at a number of points so that the load may be averaged electrically.

Background of the invention

This invention relates to force measuring devices and more particularly to devices for measuring forces of great magnitude such as those occurring at the rolls of a stand in a steel rolling mill.

To measure large compressive or tensive forces, strain gages are utilized which provide an electrical output proportional to the strain of the surface to which the strain gage is attached. In a steel rolling mill, the gage or thickness of a steel strip being rolled is a function of the "roll force" exerted on the strip as it passes between the opposing rolls of a mill stand. The "roll force" may be measured by load cells so located in the mill stand that the compressive force applied to them is proportional to the "roll force." In making a simple load cell having strain gages mounted on a steel block, hysteresis may be encountered. When the "roll force" is applied to the steel block, the block tends to expand in directions transverse to the direction of the applied forces. However, due to the elastic properties of the material from which the block is made and the friction at the load-carrying faces, the block does not contract as rapidly when the "roll force" is removed as it expanded when the same "roll force" was applied. This hysteresis effect, which is quite similar to the hysteresis effect exhibited by ferromagnetic materials, causes force measurement errors since the strain gage mounted on the block is distorted in the same manner as the block on which it is mounted. Simple load cells have certain other disadvantages. If a strain gage is mounted on an outside surface of the block, it may not sense accurately a force applied to the center of the block, or it may be subject to thermal distortion. If a strain gage is located in the interior of the block, it is difficult to install properly. In either case, replacement is delicate and difficult, usually requiring that the entire load cell be replaced if a strain gage fails. For this reason, incorporating each strain gage in a readily replaceable sensor element would be desirable.

Summary of the invention

The present invention contemplates the use of a sensor assembly within a force measuring load cell. The load cell includes a block having a load bearing surface and a tapered bore therein. The sensor assembly is removably secured to the block within the tapered bore and includes a similarly tapered plug, the edges of which are held in mating relation to the walls of the bore. A strain gage is secured to one face of the plug in a plane parallel to the axis of the forces applied to the load bearing surface of the block.

Description of the drawings

While the specification concludes with claims particularly pointing out and distinctly claiming that which is regarded as the present invention, the details of one embodiment of the invention along with its further objects and advantages may be more readily ascertained from the following detailed description when read in conjunction with the accompanying drawings in which:

Detailed description

Figure 1:
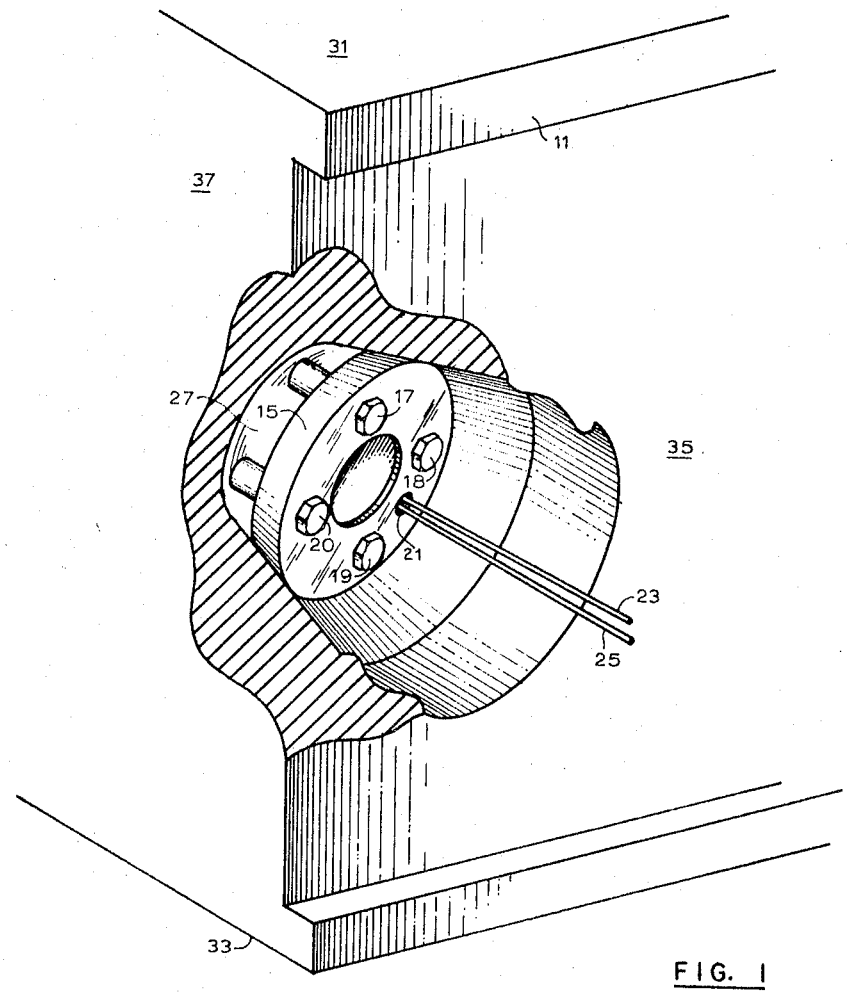
FIG. 1 is a partially cut away perspective view of a portion of a load cell constructed in accordance with the principles of the present invention.
Figure 2:
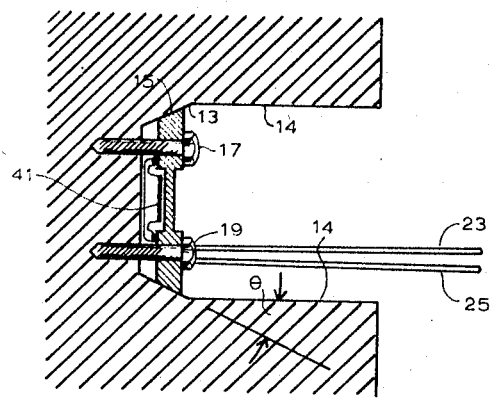
FIG. 2 is a cross-sectional view of the same load cell.

FIG. 1 depicts a load cell including a steel block 11 having a load bearing surface 31, base surface 33, a side wall 35, and an end wall 37. The force on each end of the rolls in a mill stand is normally transmitted directly to the loadbearing surface 31. Varying "roll forces" act on the load bearing surface 31 to distort the block 11. A strain gage (not shown) mounted on a plug 15 in a tapered bore in the sidewall 35 of the block 11 provides an electrical signal proportional to the distortion of block 11 and thus the "roll force" at the mill stand. The plug 15 is secured to a rear wall 27 of the tapered bore by bolts 17–20 which extend through apertures in the plug 15 and are uniformly tightened in threaded holes in the rear wall 27 by a conventional torque wrench. When a single plug is used in a load cell, it is located at the center of the block 11 or equidistant between each pair of opposing surfaces. The plug is inserted into the block 11 through a cylindrical bore 14 having a diameter larger than the diameter of the largest part of the plug 15. The cylindrical bore 14 terminates in a tapered bore 13 which, in turn, terminates in the end wall 27. The peripheral edges of the plug 15 are tapered at the same angle as the walls of the tapered bore 13. The amount of taper may be defined in terms of the angle $\theta$ between the axis of bore 14 and the walls of the tapered bore 13.

The taper of the sensor serves several useful purposes. If the sensor plug were cylindrical and not tapered, easy removal and replacement would necessitate clearance between the plug and the bore. This is undesirable as there would be no compression of the plug and no electrical output until the load is sufficient to elastically deform the block and take up the clearance. Because of the taper, the plug fits tightly in the bore with no clearance. In addition, the diameter of the plug is not critical in manufacture as any clearance is taken up when the screws are tightened.

If the angle of the taper is made equal to the friction angle (the angle whose tangent value is equal to the coefficient of friction) for the materials used, the application of a compressive force to the load cell does not produce a force tending to eject the sensor. If the angle of the taper is made larger than the friction angle, the sensor tends to be forced out of the tapered hole when the load is applied. When the load is reduced, the sensor tends to move back into the tapered hole because of the elasticity of the screws 17–20. Because of sliding friction at the faces of the sensor plug, a *negative* hysteresis results. During a decreasing load, friction prevents the plug from entering the tapered bore as far as during increasing load, resulting in a reduction in compression and electrical output and negative hysteresis.

A simple compression load cell of limited height will ordinarily have a positive hysteresis because the compression causes a lateral expansion which is resisted by the sliding friction at the load carrying faces. These compressive friction forces at the faces give rise (due to the Poisson effect) to an elongation in the direction of the load force and, therefore, a reduced electrical output. During decreasing loads the reverse effect takes place and the electrical output is higher. This positive hysteresis can be neutralized by making the angle of taper large enough to give rise to an equal negative hysteresis. The positive hysteresis may vary with the materials and surface condition of the load carrying faces of the load cell and the size, materials and surface condition of the members that apply the load forces. Ordinarily, sufficient accuracy in measurements may be obtained if the positive hysteresis is reduced to a low value. It has been found that an angle of taper of about 10 degrees will, for one particular configuration of load cell, result in a low and slightly negative overall hysteresis.

Of course, the sensor plug 15 with its strain gage 41 may be easily removed from the bore and replaced with another sensor plug if necessary. The strain gage 41 may be any of the normal types of strain gages, including the metallic wire type, foil type, or semiconductor type. A further advantage of locating the plug 15 and the sensor 41 centrally within the block 11 is that the block 11 tends to insulate the strain gage 41 from extraneous heat radiation to minimize the distortive effects of extraneous temperature changes.

Figure 3:
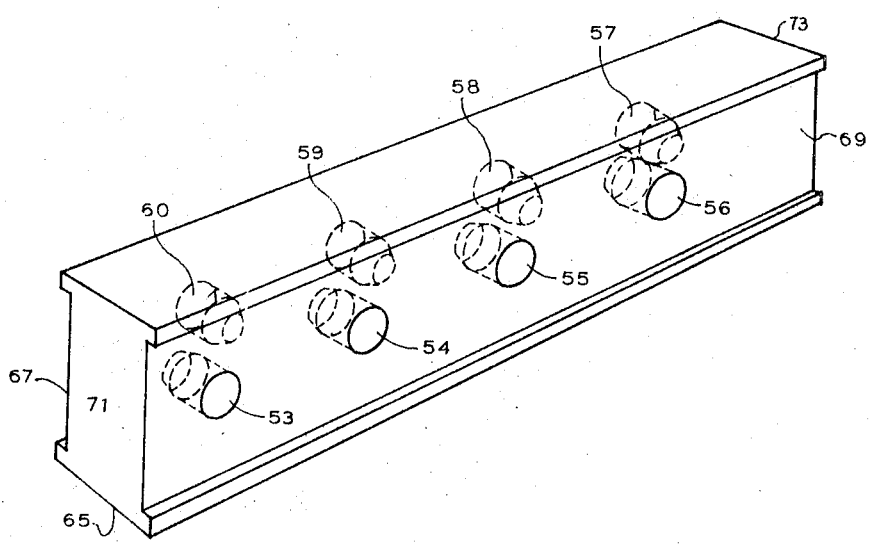
FIG. 3 shows a complete load cell with the optimum locations for a plurality of strain gages.

If the loading on the surfaces of the load cell is not uniform, a number of sensor plugs may be used to sample the load at a number of points so that the load may be averaged electrically. FIG. 3 shows a block 51 having load bearing surface 63, surface 65, side walls 67 and 69, and end walls 71 and 73. Each of eight bores 53–60 are drilled to sufficient depths that plugs secured therein are located within the block approximately a third of the distance between the side walls 67 and 69. Bores 53–60 are spaced along the side walls of the block 51 in positions which permit measurement of force values which may be averaged to obtain an average force value even though the force is distributed unevenly on the load bearing surface 63.

While there has been described at present what is thought to be a preferred embodiment of the present invention, it is obvious that variations and modifications will occur to those skilled in the art. For example, it would not be necessary to use a conical plug since a square plug having its upper and lower walls tapered would serve the same purpose. The load carrying block instead of being rectangular could be cylindrical or of other configuration as desirable for particular applications. Therefore, it is intended that the appended claims shall cover all such variations and modifications as fall within the true spirit and scope of the invention.

I claim:
1. For use in a force measuring load cell having a block with a tapered bore therein and a load bearing surface, an assembly including:

(a) a similarly-tapered plug located within the bore;
(b) means for securing said plug within the bore to maintain mating relation between the edges of said plug and the walls of the bore; and
(c) a strain gage secured to one face of said plug in a plane parallel to the direction of the force applied to the load bearing surface of the block.

2. An assembly as recited in claim 1 wherein the walls of the bore and the edges of said plug are conical.

3. An assembly as recited in claim 2 wherein the walls of the bore and the edges of said plug are secured in mating relation by one or more threaded fasteners extending through said plug into the block, the axis of the fasteners being perpendicular to the axis of the forces applied to the load bearing surfaces of the block.

4. A force-measuring load cell including:
(a) a block having a load bearing surface lying in a plane perpendicular to the axis of the forces applied to said block and at least one tapered bore having an axis parallel to the plane of said load bearing surface;
(b) at leats one similarly-tapered plug located within the bore;
(c) means for securing said plug within the bore to maintain mating relation between the edges of said plug and the walls of the bore; and
(d) a strain gage secured to one face of each plug in a plane parallel to the axis of the forces applied to the load bearing surface.

5. A force measuring load cell as recited in claim 4 wherein the walls of each bore and the edges of each plug are conical.

6. An assembly as recited in claim 5 wherein the walls of each bore and the edges of each plug are secured in mating relation by one or more threaded fasteners extending through said plug into said block in a plane perpendicular to the plane of the forces applied to the load bearing surface of the block.

7. An assembly as recited in claim 6 wherein the said load cell includes a plurality of bores with plugs removably secured therein.

References Cited

UNITED STATES PATENTS 3,184,964  5/1965  Hedrick.
3,330,154  7/1967  Habern et al. _____ 73—88.5
3,376,537  4/1968  Pugnaire.

FOREIGN PATENTS 206,760  8/1966  Sweden.

RICHARD C. QUEISSER, Primary Examiner.

J. WHALEN, Assistant Examiner.

U.S. Cl. X.R.

73—88.5; 338—2, 5